(12) United States Patent
Rose (10) Patent No.: US 7,493,916 B2
(45) Date of Patent: Feb. 24, 2009

(54) PRESSURE VESSEL WITH ACCUMULATOR ISOLATION DEVICE

(75) Inventor: Kenric Rose, Howell, MI (US)

(73) Assignee: Bosch Rexroth Corporation, Hoffman Estates, IL (US)

( * ) Notice: Subject to any disclaimer, the term of this patent is extended or adjusted under 35 U.S.C. 154(b) by 0 days.

(21) Appl. No.: 11/298,623

(22) Filed: Dec. 12, 2005

(65) Prior Publication Data

US 2007/0131295 A1    Jun. 14, 2007

(51) Int. Cl.
*F16L 55/04* (2006.01)
(52) U.S. Cl. .......................................... 138/30; 138/26
(58) Field of Classification Search .................. 138/26, 138/30
See application file for complete search history.

(56) References Cited

U.S. PATENT DOCUMENTS

| | | | | |
|---|---|---|---|---|
| RE24,382 E | * | 10/1957 | Greer | 138/31 |
| 3,224,345 A | * | 12/1965 | Doetsch | 92/94 |
| 3,319,658 A | * | 5/1967 | Mercier | 138/30 |
| 3,605,815 A | * | 9/1971 | Von Forell | 138/30 |
| RE28,890 E | * | 7/1976 | Ingram et al. | 303/113.1 |
| 4,162,692 A | | 7/1979 | Greer et al. | |
| 4,408,635 A | * | 10/1983 | Packer | 138/30 |
| 4,429,718 A | * | 2/1984 | Mercier | 138/30 |
| 4,487,226 A | | 12/1984 | Chun | |
| 4,497,388 A | * | 2/1985 | Dexter | 181/233 |
| 4,651,781 A | * | 3/1987 | Kandelman | 138/30 |
| 5,148,834 A | * | 9/1992 | Reinartz et al. | 138/31 |
| 5,425,573 A | * | 6/1995 | Mirlocca | 303/87 |
| 5,967,623 A | | 10/1999 | Agnew | |
| 6,063,275 A | * | 5/2000 | Traylor | 210/248 |
| 6,105,686 A | * | 8/2000 | Niemi | 173/208 |
| 6,164,336 A | * | 12/2000 | Pasquet et al. | 138/30 |
| 6,564,830 B1 | * | 5/2003 | Smith | 138/30 |
| 6,848,755 B2 | | 2/2005 | Yuda et al. | |
| 6,923,215 B2 | * | 8/2005 | Weber | 138/31 |
| 7,048,009 B2 | * | 5/2006 | Verhaeghe | 138/31 |
| 2003/0075225 A1 | * | 4/2003 | Dinkel et al. | 138/31 |
| 2003/0077183 A1 | * | 4/2003 | Franchet et al. | 417/269 |
| 2003/0221733 A1 | * | 12/2003 | Wilkes | 138/30 |
| 2004/0123912 A1 | * | 7/2004 | Weber | 138/30 |
| 2004/0238054 A1 | * | 12/2004 | Weber | 138/31 |
| 2005/0193730 A1 | * | 9/2005 | Rose | 60/413 |
| 2007/0084516 A1 | * | 4/2007 | Rose | 138/30 |

FOREIGN PATENT DOCUMENTS

| | | |
|---|---|---|
| DE | 39 20030 A1 | 12/1989 |
| JP | 2000104701 | 4/2000 |
| WO | WO 2005/061904 | 7/2005 |
| WO | WO 2005/088137 A1 | 9/2005 |

* cited by examiner

*Primary Examiner*—James F Hook
(74) *Attorney, Agent, or Firm*—Berenato, White & Stavish (57) ABSTRACT

A pressure vessel assembly is provided for a pressurized fluid system. The pressure vessel assembly comprises an outer casing defining an interior cavity within the outer casing, at least one fluid-pressure accumulator disposed within the interior cavity in the outer casing, and at least one isolation device disposed between the at least one fluid-pressure accumulator and the outer casing.

10 Claims, 12 Drawing Sheets

PRESSURE VESSEL WITH ACCUMULATOR ISOLATION DEVICE

BACKGROUND OF THE INVENTION

1. Field of the Invention

The present invention relates to pressurized fluid systems in general, and, more particularly, to a pressure vessel assembly of a pressurized fluid system including at least one fluid-pressure accumulator.

2. Description of the Prior Art

In conventional integrated pressurized fluid systems the recovered energy is normally accumulated in hydraulic fluid accumulators. The latter are of known technology and, in comparison with the other recovery and accumulation arrangements, such as flywheel accumulators and electrochemical batteries, they are more flexible in use, notably in connection with a vehicular transmission to which they are connected. On the other hand they remain less efficient in terms of mass and volume and consequently raise serious problems for fitting onto motor vehicles. In addition to penalizing the energy savings obtained, these problems of dead weight and bulk lead to high costs linked either with the hydraulic fluid accumulator itself or, mainly, with the modifications that have to be made to the vehicle to fit the accumulator. The result is that the motor vehicles equipped with the hydraulic fluid accumulator are no longer standard in any way and are therefore much more expensive to produce and maintain and that, furthermore, the equipment used for this installation cannot be transposed to another vehicle or modulated in size, which increases the overall cost of such an installation.

Moreover, the conventional metal shell fluid accumulators are rather heavy. Furthermore, in some applications, including mobile applications, such as regenerative drive systems of motor vehicles, the fluid accumulators are exposed to excessive vibrations and operate in particularly harsh environments. In order to address these issues, some fluid accumulators are fabricated from a composite material in order to significantly reduce the weight of the fluid accumulators and to protect them in the harsh environments. However, the composite shell accumulators require extra consideration with regards to mounting and vibration. The composite outer shells of the fluid accumulators also tend to expand under pressure. This expansion is most apparent along longitudinal axes of the accumulators. Moreover, the need exists to package and protect the sensitive composite shelled hydro-pneumatic accumulators against physical damage, shock and vibration in the mobile applications. Also there is a need to provide a protective structure for personnel and/or equipment in the vicinity of the accumulators in the event of a failure of the pressure shell.

Accordingly, it is the intent of this invention to overcome these shortcomings of the prior art by providing a pressure vessel assembly housing fluid accumulators in order to protect them against physical damage, shock, vibration and linear expansion in the mobile applications, and capable of being fitted to various types of pressurized fluid systems, including motor vehicles equipped with hydraulic regenerative drive system.

SUMMARY OF THE INVENTION

The present invention provides a pressure vessel assembly for use in a pressurized fluid system. The pressure vessel assembly of the present invention is especially suitable for a hydraulic regenerative drive system of a motor vehicle.

The pressure vessel assembly of the present invention comprises an outer casing defining an interior cavity within the outer casing. The outer casing houses at least one fluid-pressure accumulator disposed in the interior cavity of the pressure vessel assembly. The pressure vessel assembly further includes at least one isolation device disposed between the at least one fluid-pressure accumulator and the outer casing.

The pressure vessel assembly in accordance with the present invention provides adequate protection of the fluid-pressure accumulator when used in harsh environments, such as in mobile applications in a regenerative drive system of a motor vehicle.

BRIEF DESCRIPTION OF THE DRAWINGS

Objects and advantages of the invention will become apparent from a study of the following specification when viewed in light of the accompanying drawings, wherein.

DESCRIPTION OF PREFERRED EMBODIMENT

The preferred embodiments of the present invention will now be described with the reference to accompanying drawings.

Figure 1:
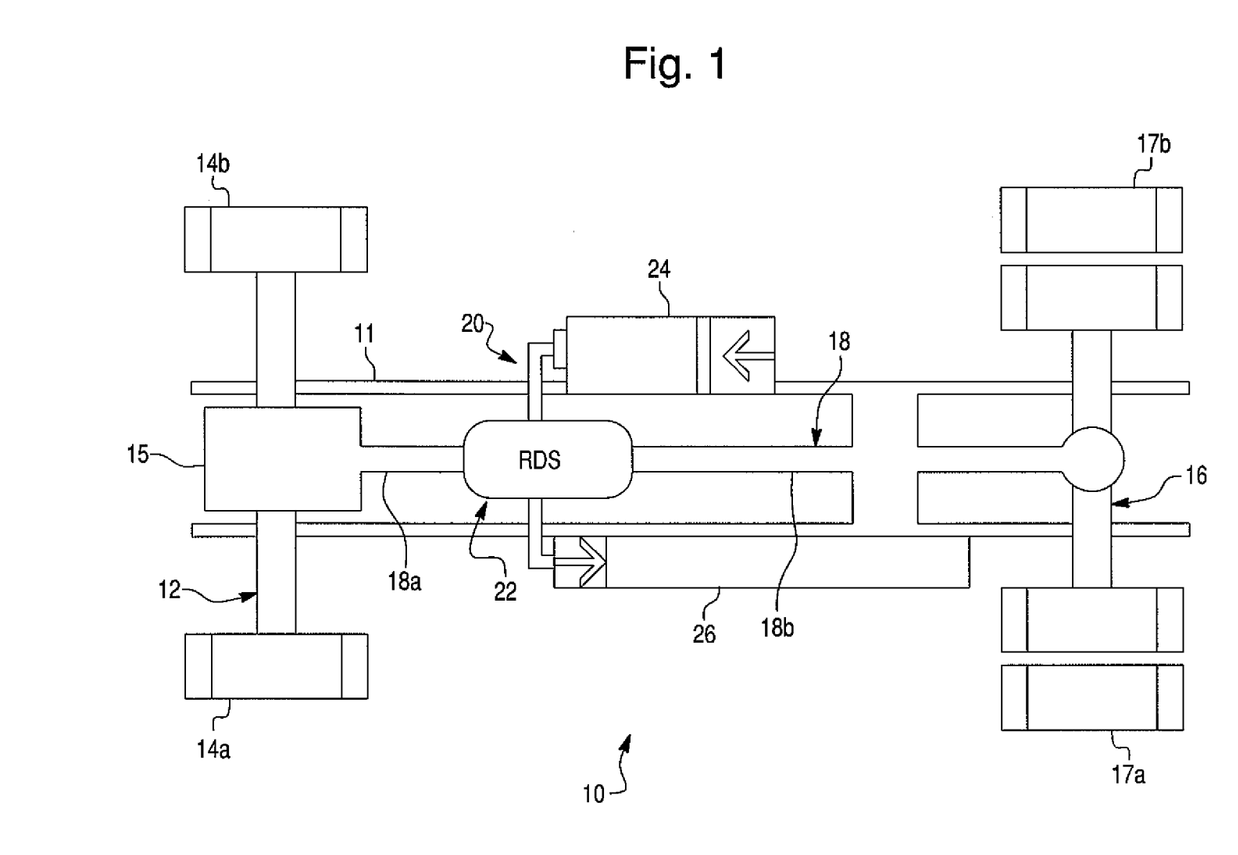
FIG. 1 is a schematic view of a motor vehicle equipped with a hydraulic regenerative drive system.

FIG. 1 schematically depict a motor vehicle 10 equipped with a pressurized hydraulic fluid system in the form of a hydraulic regenerative drive system 20 in accordance with the preferred embodiment of the present invention. As illustrated, the motor vehicle 10 comprises a front axle 12 having wheels 14a and 14b, a rear drive axle 16 having wheels 17a and 17b driven by a prime mover 15, such as an internal combustion engine, through a driveline 18. The hydraulic regenerative drive system 20 includes a low-pressure fluid reservoir 24, at least one high-pressure hydraulic accumulator 26 and a hydraulic regenerative drive unit 22 in fluid communication with both the low-pressure fluid reservoir 24 and the high-pressure accumulator 26. The fluid reservoir 24 of the hydraulic regenerative drive system 20, shown in FIG. 1, contains an appropriate amount of a hydraulic working fluid, such as oil, at either atmospheric or low above-atmospheric pressure. In other words, the fluid reservoir 24 is at least partially filled with the working hydraulic fluid.

It will be appreciated that while the present invention is described in relation to the hydraulic regenerative drive system for the motor vehicle, as most suitable to mobile applications, any appropriate pressurized fluid system including at least one high-pressure fluid accumulator is within the scope of the present invention. For example, any apparatus or system in a harsh environment may benefit from the present invention.

Figure 2:
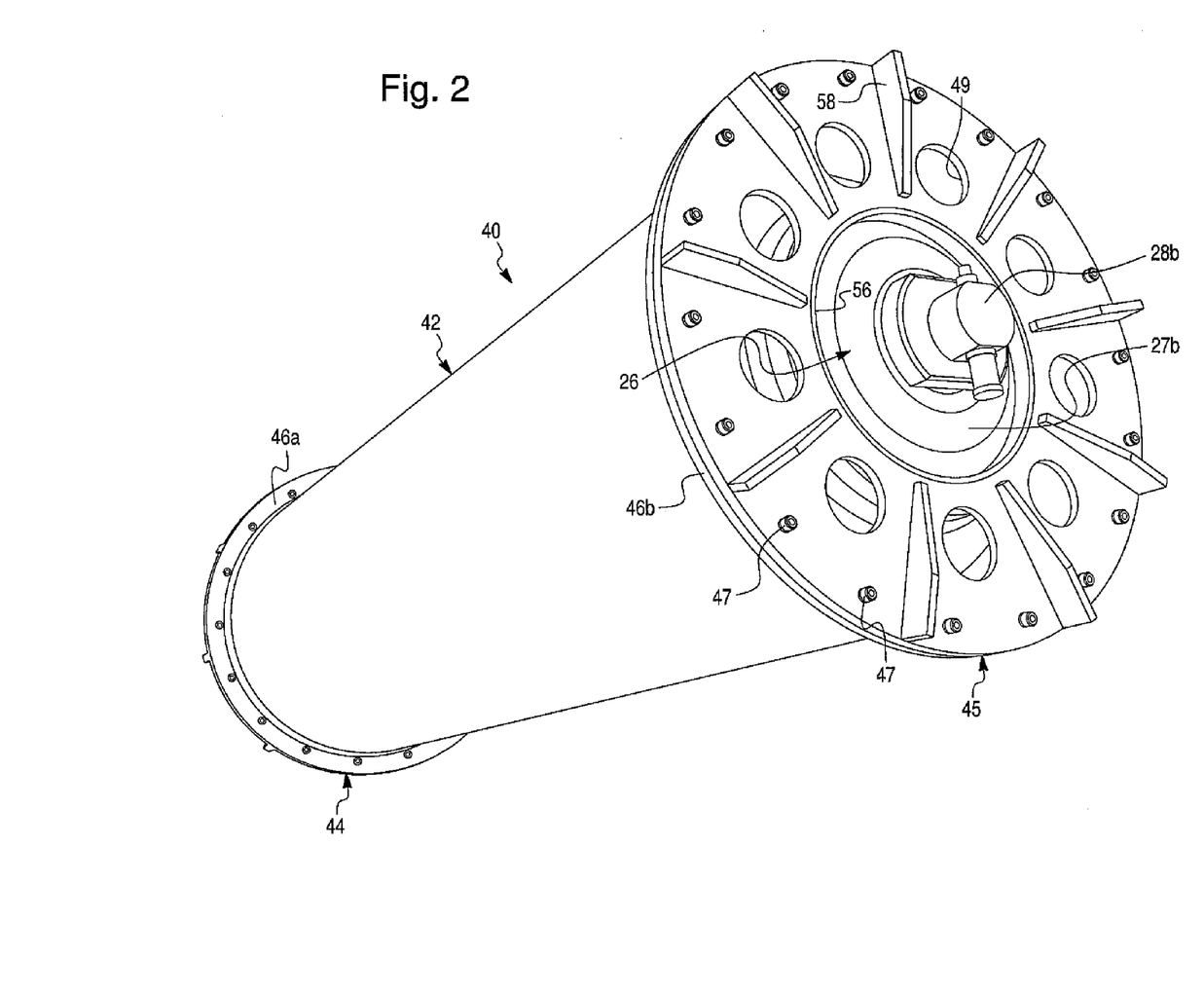
FIG. 2 is a perspective view of a pressure vessel assembly in accordance with a first exemplary embodiment of the present invention.
Figure 3:
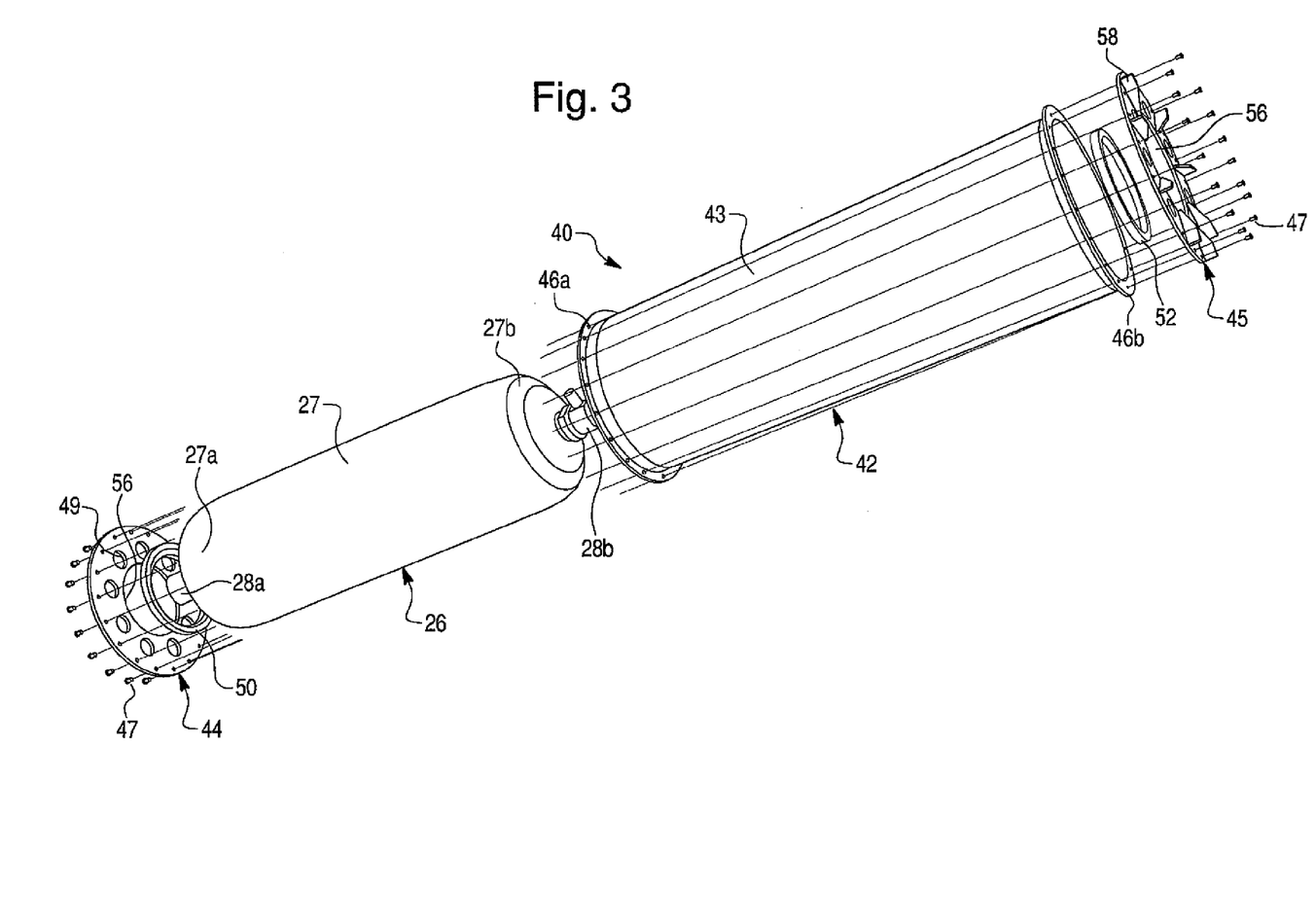
FIG. 3 is an exploded perspective view of the pressure vessel assembly in accordance with the first exemplary embodiment of the present invention.
Figure 4:
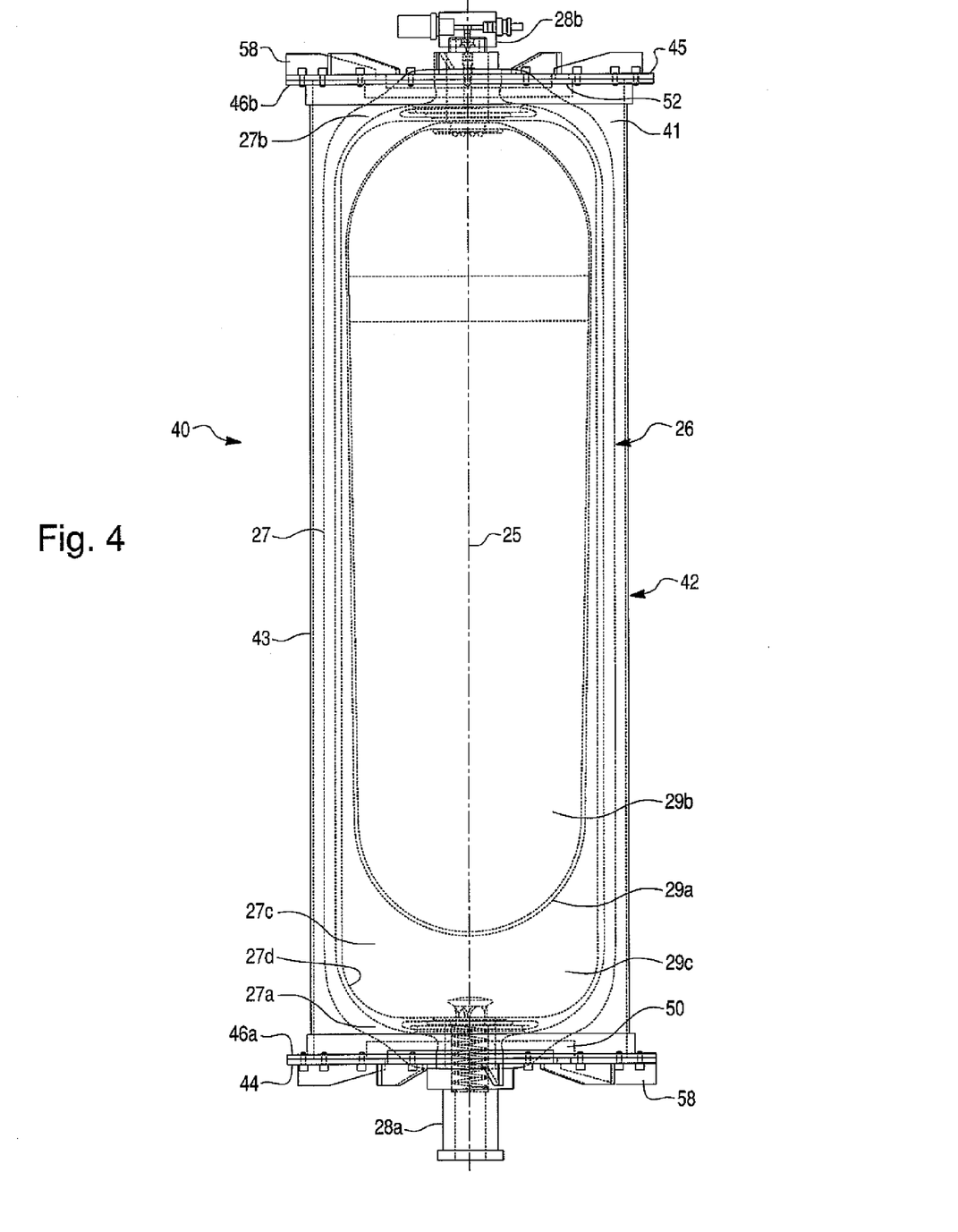
FIG. 4 is a sectional view of the pressure vessel assembly in accordance with the first exemplary embodiment of the present invention.

The pressurized fluid system 20 includes one or more pressure vessel assemblies 40 each including at least one fluid-pressure accumulator 26. Preferably, as illustrated in FIGS. 2-4, each of the pressure vessel assemblies 40 houses one fluid-pressure accumulator 26. The pressure vessel assemblies 40 are secured to the motor vehicle 10 at any appropriate location thereof, such as to a vehicle body or a vehicle frame. If a plurality of the pressure vessel assemblies 40 are employed, they may be mounted to the motor vehicle 10 separately or as a group within a common accumulator storage housing, such as a hydraulic component module 30 shown in FIGS. 10-12.

As further illustrated in detail in FIGS. 2-4, each of the pressure vessel assemblies 40 comprises a hollow outer casing 42 elongated along a central axis 25 (shown in FIG. 4), and at least one fluid-pressure accumulator 26 disposed within the outer casing 42 substantially coaxially to the central axis 25. In turn, the outer casing 42 includes a hollow, elongated sidewall section 43 having opposite open ends, and opposite first and second closure members 44 and 45, respectively, provided at the opposite ends thereof to define an interior cavity 41 within the outer casing 42. Preferably, the outer casing 42 is in the form of an open ended mounting tube such that the sidewall section 43 of the mounting tube 42 is substantially cylindrical in shape and is provided with substantially annular mounting flanges 46a and 46b at the opposite ends thereof. Accordingly, the opposite closure members 44 and 45 are removably mounted to the mounting flanges 46a and 46b of the sidewall section 43 of the outer casing 42 by any appropriate means known in the art, such as threaded fasteners 47. Further preferably, the single fluid-pressure accumulator 26 is disposed within the interior cavity 41 in the outer casing 42 of each of the pressure vessel assemblies 40. It will be appreciated that any appropriate type of the high-pressure hydraulic accumulators 26 may be employed. Preferably, the hydraulic accumulators 26 are hydro-pneumatic accumulators known in the art. Each of the hydro-pneumatic accumulators 26 includes an outer pressure shell 27 having opposite first and second ends 27a and 27b, respectively. The outer pressure shell 27 defines a cavity 27c therein containing the hydraulic working fluid under pressure. As illustrated in detail in FIG. 4, the fluid-pressure accumulator 26 further includes a separating member, such as a resilient bladder 29a, movable within the outer pressure shell 27. The outer pressure shell 27 further defines an enclosed fluid chamber 29c between an inner peripheral surface 27d of the outer pressure shell 27 and the resilient bladder 29a. The enclosed fluid chamber 29c is provided for containing the hydraulic working fluid under pressure therein so that the inner peripheral surface 27d of the outer pressure shell 27 is in direct contact with the working fluid under pressure. An enclosed chamber 29b inside the resilient bladder 29a defines a pressure chamber containing a gas, such as nitrogen, under pressure. Moreover, the outer shell 27 is provided with a communication port 28a connected to the regenerative drive unit 22, and a gas charging port 28b mounted to the opposite ends 27a and 27b, respectively, of the outer shell 27. The communication port 28a provides fluid communication between the fluid chamber 29c and the regenerative drive unit 22, while the gas charging port 28b provides fluid communication between the pressure chamber 29b and a gas charging device (not shown). Preferably, the outer shell 27 is elongated in the direction of the central axis 25 coaxially thereto.

Each of the closure members 44 and 45 has a central aperture 56 for receiving the gas charging port 28b of the accumulator 26 therethrough. Preferably, the central apertures 56 are substantially coaxial to the central axis 25. The closure members 44 and 45 are further provided with a plurality of stiffening gussets 58. Also, as shown in FIGS. 2-4, the closure members 44 and 45 of the outer casing 42 are provided with one or more ventilation holes 49 therethrough. In the event of an accumulator failure where pressurized gas/liquid is expelled from the outer shell 27 of the hydro-pneumatic accumulator 26 into the interior cavity 41 of the outer casing 42, these ventilation holes 49 will prevent pressure from building up in the outer casing 42. It will be appreciated that the presence and configuration of these ventilation holes 49 may vary from application to application.

Generally, the configuration of the outer casing 42 depends on a particular application. For example, in some applications the outer casing 42 is rectangular and incorporates two accumulators 26. The material of the outer casing 42 also depends on the application. For environments where weight is of primary concern and there is little environmental risk, light-weight materials or a space frame of a motor vehicle may be used. For harsher environments stronger materials could be used. For example, in a military application if may be desirable to use an armored steel for the outer casing 42. Some designs may also incorporate a double wall outer casing structure that would allow for fluid storage.

The elongated outer shells 27 of the hydro-pneumatic accumulators 26 are fabricated from any appropriate material known in the art. Preferably, the elongated outer shells 27 of the hydro-pneumatic accumulators 26 are fabricated from an appropriate composite material in order to protect them in harsh environments, such as in mobile applications in the regenerative drive systems of the motor vehicles. However, the composite shell accumulators require extra consideration with regards to mounting and vibration. The composite outer shells 27 also tend to expand under pressure. This expansion is most apparent along the longitudinal axes 25 of the accumulators 26.

According to a first exemplary embodiment of the present invention, the hydraulic accumulator 26 is mounted within the interior cavity 41 of the pressure vessel assembly 40 by the opposite closure members 44 and 45 through first and second vibration isolation devices 50 and 52, respectively. Preferably, according to the first exemplary embodiment of the present invention and illustrated in detail in FIGS. 3-4, the first and second isolation devices 50 and 52 are in the form of vibraton isolator rings made of a substantially elastomeric material, such as rubber. Further preferably, the elastomeric isolator rings 50 and 52 are substantially identical.

Therefore, according to the first exemplary embodiment of the present invention, the closure members 44 and 45 engage the shell 27 of the accumulator 26 through the elastomeric isolator rings 50 and 52 disposed at the opposite ends 27a and 27b of the shell 27, respectively. Such an arrangement supports and protects the accumulator 26 within the outer casing 42 against physical damage so that shock and vibration of the accumulator 26 is controlled through the use of elastomeric isolator rings 50 and 52. The linear expansion of the elongated outer shell 27 of the hydro-pneumatic accumulator 26 is also taken up by the elastomeric isolator rings 50 and 52 at both ends of the accumulator 26. Moreover, the outer casing 42 of the pressure vessel assembly 40 provides a protective structure for personnel and/or equipment in the vicinity of the accumulator 26 in the event of a failure of the pressure shell 27 of the accumulator 26.

Figure 5:
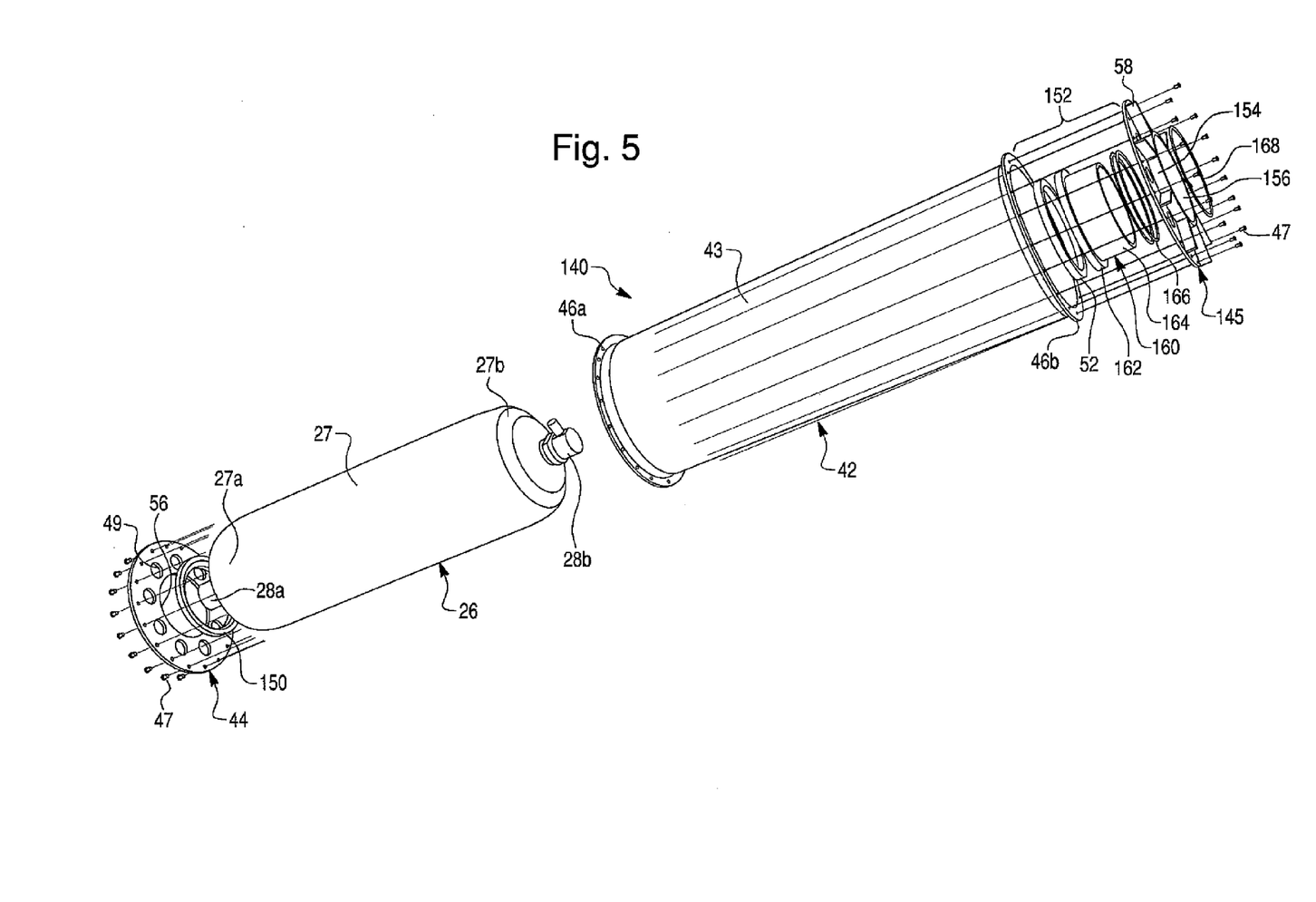
FIG. 5 is an exploded perspective view of a pressure vessel assembly in accordance with a second exemplary embodiment of the present invention.
Figure 6:
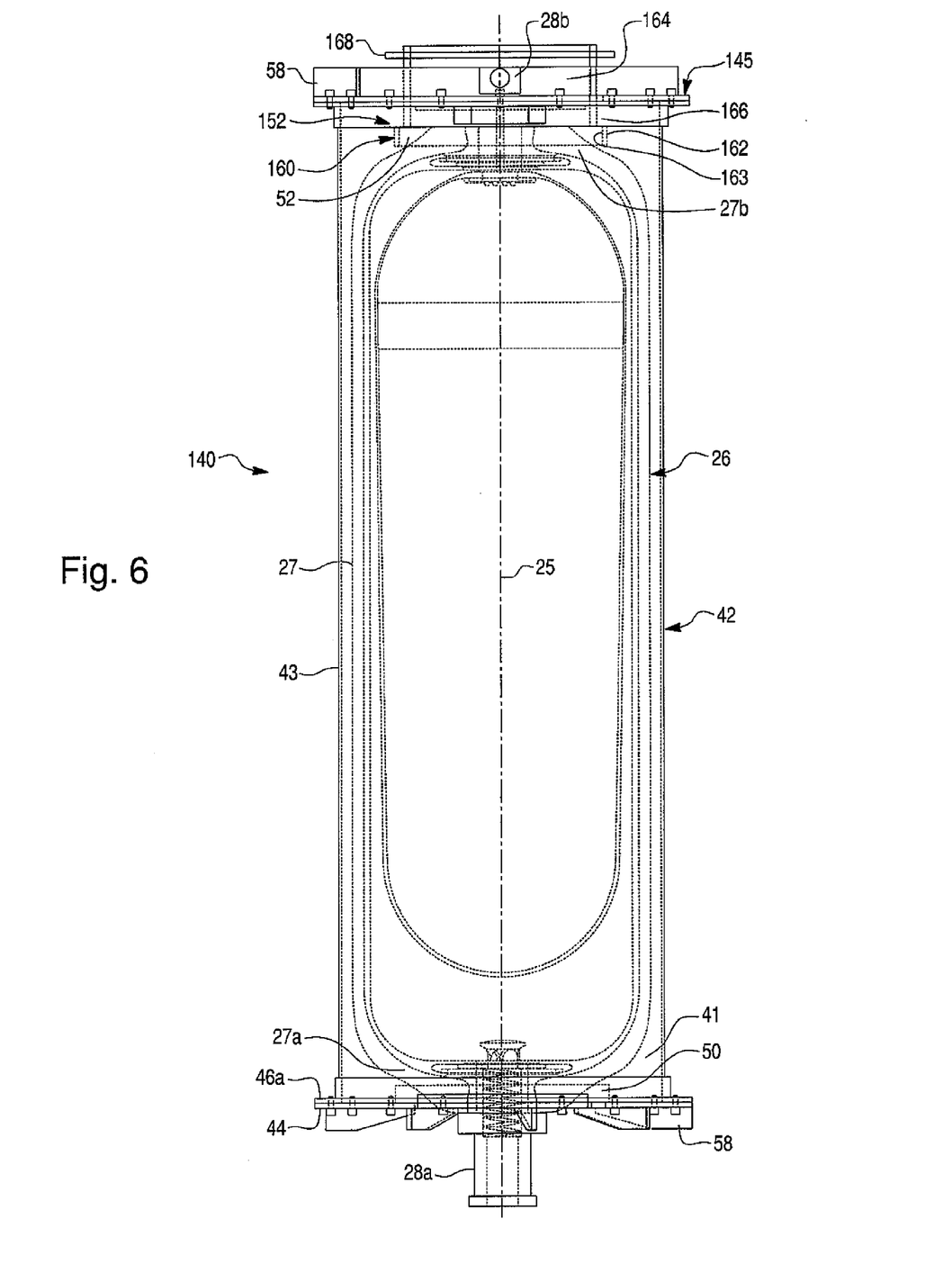
FIG. 6 is a sectional view of the pressure vessel assembly in accordance with the second exemplary embodiment of the present invention.
Figure 7:
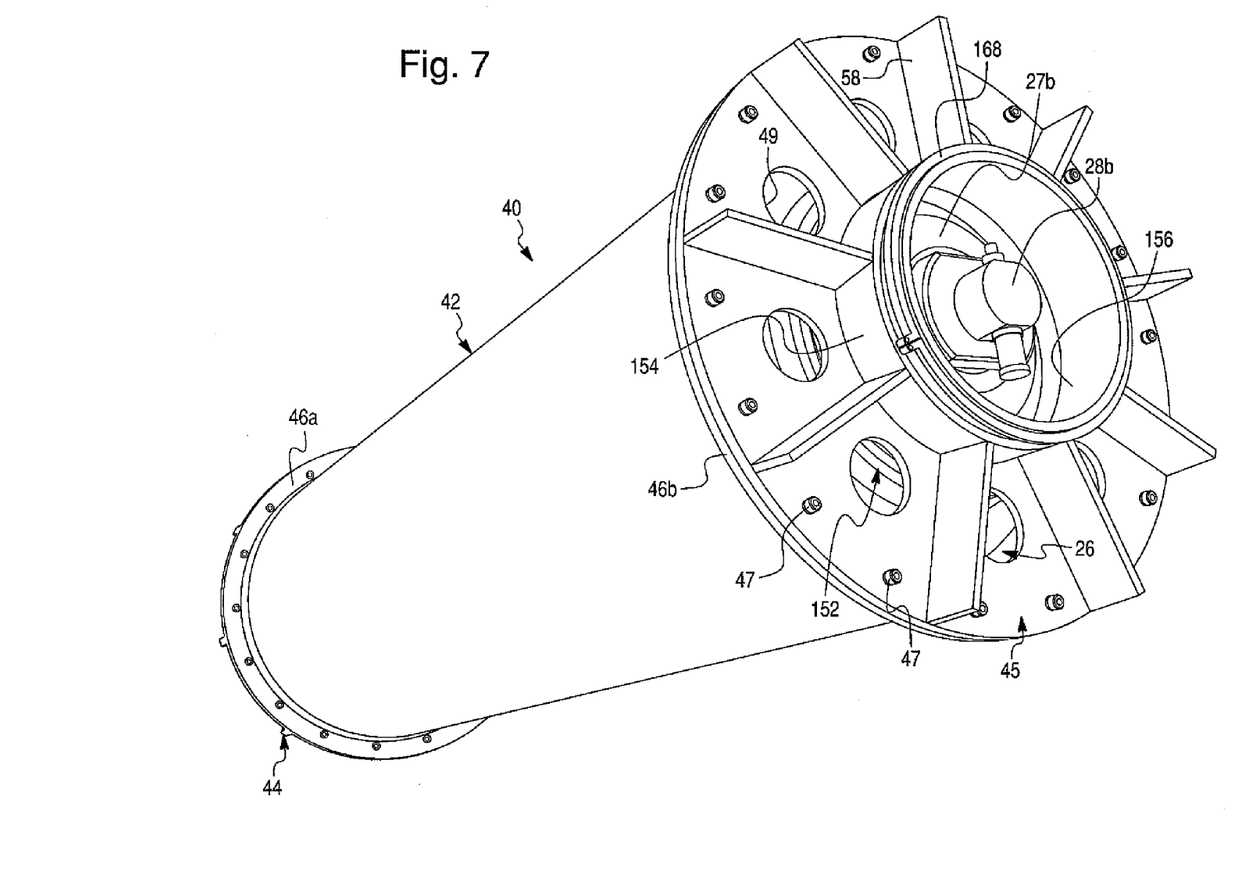
FIG. 7 is a perspective view of the pressure vessel assembly in accordance with the second exemplary embodiment of the present invention.

FIGS. 5-7 of the drawings illustrate a second exemplary embodiment of a pressure vessel assembly of the pressurized fluid system, such as the hydraulic regenerative drive system 20 of the motor vehicle 10. Components, which are unchanged from, or function in the same way as in the first exemplary embodiment depicted in FIGS. 1-4 are labeled with the same reference numerals, sometimes without describing detail since similarities between the corresponding parts in the two embodiments will be readily perceived by the reader.

A pressure vessel assembly 140 of the second exemplary embodiment of the present invention comprises a hollow, elongated outer casing 42 and at least one fluid-pressure accumulator 26 disposed within the outer casing 42. In turn, the outer casing 42 includes a hollow, elongated sidewall section 43 having opposite open ends, and opposite first and second closure members 44 and 145, respectively, provided at the opposite ends thereof to define an interior cavity 41 within the outer casing 42.

Moreover, the second closure member 145 has an annular guide neck 154 extending along the central axis 25 substantially coaxially thereto and defining a central aperture 156 in the second closure member 145 receiving the gas charging port 28b of the accumulator 26 therethrough. Preferably, the central aperture 156 is substantially coaxial to the central axis 25. The second closure member 145 is further provided with a plurality of stiffening gussets 58 extending between the ventilation holes 49.

According to the second exemplary embodiment of the present invention as illustrated in detail in FIGS. 5-7, the hydraulic accumulator 26 is held within the interior cavity 41 of the pressure vessel assembly 140 by the opposite closure members 44 and 145 through first and second isolation devices 150 and 152, respectively. More specifically, the first isolation device 150 is in the form of a first elastomeric isolator ring 50 substantially identical to the first elastomeric isolator ring 50 of the first exemplary embodiment of the present invention shown in FIGS. 2-4. Similarly to the first exemplary embodiment of the present invention, the elastomeric isolator ring 50 is sandwiched between the first end 27a of the shell 27 of the accumulator 26 and the closure member 44 of the outer casing 42 of the pressure vessel assembly 140. The second isolation device 152, on the other hand, includes a second elastomeric isolator ring 52, a guided-sliding isolator ring support member 160, and an isolator ring load spring 166. The isolator ring support member 160 includes an annular support flange 162 and a substantially cylindrical guided neck 164 extending from the support flange 162 and through the guide neck 154 of the second closure member 145 in the direction away from the accumulator 26 and substantially coaxially to the central axis 25. As further shown in FIGS. 8 and 9, a distal end of the guided neck 164 of the isolator ring support member 160 extending through the guide neck 154 of the second closure member 145 is provided with a retaining ring 168 limiting the inward movement the guided neck 164 into the outer casing 42 toward the accumulator 26.

The isolator ring 52 is disposed in a groove 163 formed in the support flange 162 of the isolator ring support member 160. The isolator ring load spring 166 is sandwiched between the second closure member 145 and the support flange 162 of the isolator ring support member 160 so as to bias the second elastomeric isolator ring 52 against the second end 27b of the shell 27 of the hydraulic accumulator 26. In other words, the isolator ring 52 is mounted on one side of the support flange 162 facing the accumulator 26, while the load spring 166 sits against the other side of the support flange 162 facing the second closure member 145.

Thus, the closure members 44 and 145 engage the shells 27 of the accumulator 26 through the first and second isolation devices 150 and 152 disposed at the opposite ends 27a and 27b of the shell 27, respectively. More specifically, the first end 27a of the shell 27 is supported by the first elastomeric isolator ring 50 and the second end 27b of the shell 27 is supported by the isolator ring support member 160 through the second elastomeric isolator ring 52. In use, vibration of the hydraulic accumulator 26 is controlled and suppressed by the first and second elastomeric isolator rings 50 and 52. Furthermore, when the shell 27 of the hydraulic accumulator 26 expands, it displaces the isolator ring support member 160 axially outwardly toward the second closure member 145 against the biasing force of the isolator ring load spring 166. During this displacement, the guided neck 164 of the isolator ring support member 160 slides in and is guided by the guide neck 154 of the second closure member 145 of the pressure vessel assembly 140. When, however, the shell 27 of the hydraulic accumulator 26 contracts, the isolator ring support member 160 moves axially inwardly away from the second closure member 145 due to the biasing force of the isolator ring load spring 166 guided by the guide neck 154 of the second closure member 145. Such an arrangement of the second isolation device 152 allows to maintain firm contact between the elastomeric isolator ring 52 and the accumulator shall 27 while taking up linear expansion or contraction of the accumulator shall 27. The linear expansion of the accumulator shall 27 of the hydro-pneumatic accumulator 26 is also partially taken up by the first elastomeric isolator ring 50 at the first end 27a of the shell 27.

Therefore, according to the second exemplary embodiment of the present invention, the hydro-pneumatic accumulator 26 is supported and protected the accumulator 26 within the outer casing 42 against physical damage so that vibration of the accumulator 26 is controlled through the use of elastomeric isolator rings 50 and 52 of the first and second isolation devices 150 and 152, respectively, while the linear expansion of the elongated outer shell 27 of the hydro-pneumatic accumulator 26 is taken up primarily by the spring loaded and guided isolator ring support member 160 of the second isolation device 152 at one end of the accumulator 26 and partly by the first elastomeric isolator ring 50 of the first isolation device 150 at the other end of the accumulator 26.

Figure 8:
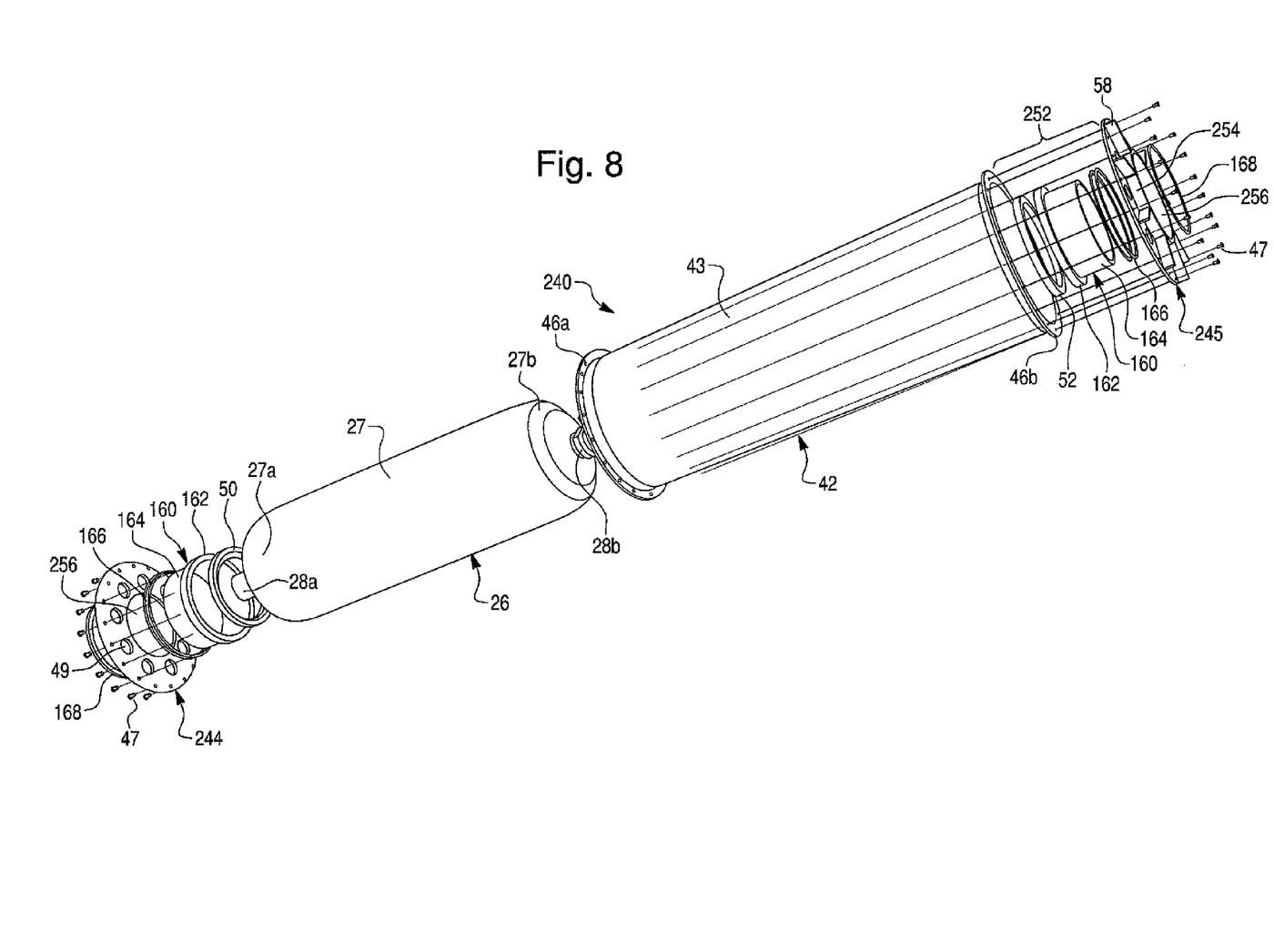
FIG. 8 is an exploded perspective view of a pressure vessel assembly in accordance with a third exemplary embodiment of the present invention.
Figure 9:
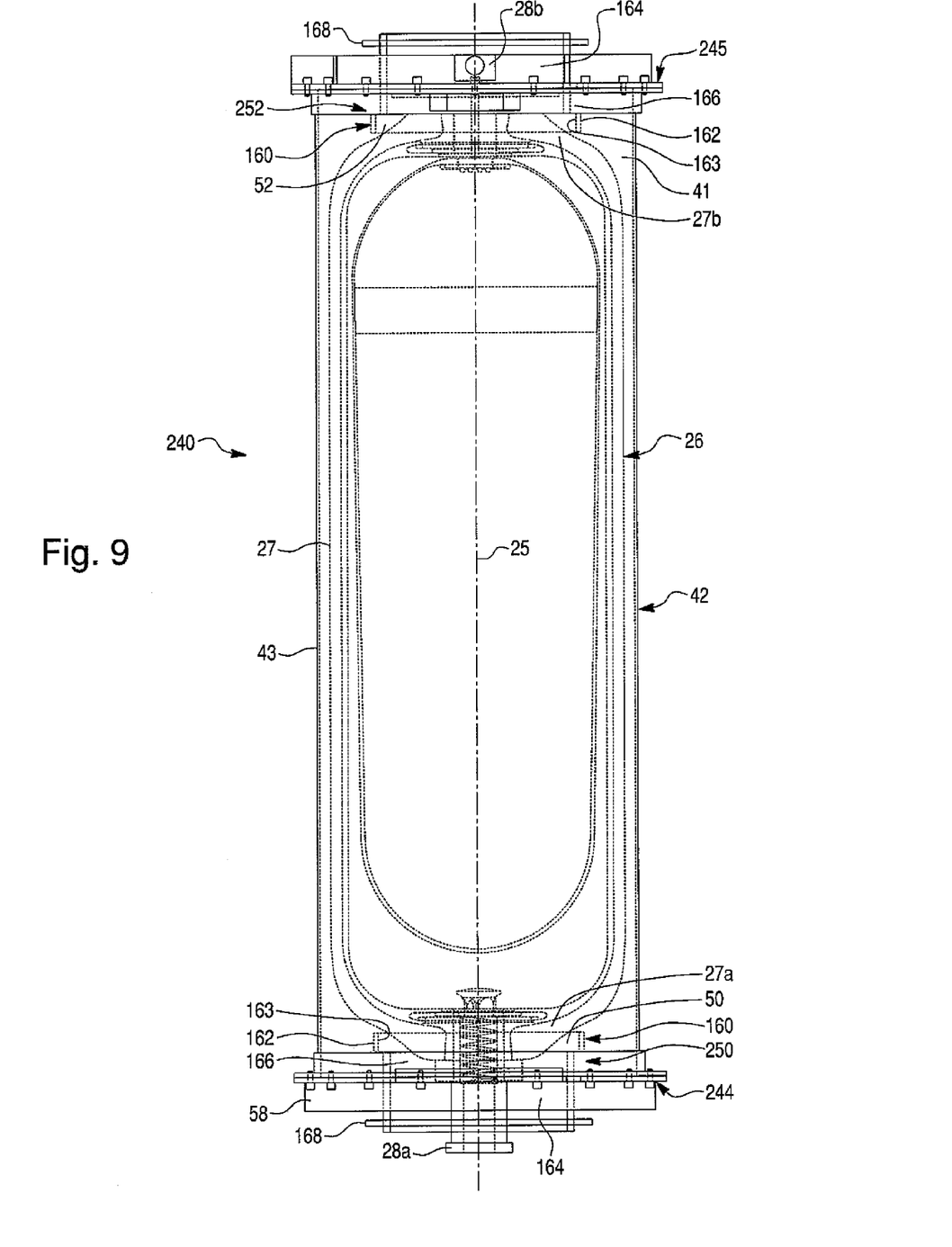
FIG. 9 is a sectional view of the pressure vessel assembly in accordance with the third exemplary embodiment of the present invention.

FIGS. 8 and 9 of the drawings illustrate a third exemplary embodiment of a pressure vessel assembly of the pressurized fluid system, such as the hydraulic regenerative drive system 20 of the motor vehicle 10. Components, which are unchanged from, or function in the same way as in the first exemplary embodiment depicted in FIGS. 1-7 are labeled with the same reference numerals, sometimes without describing detail since similarities between the corresponding parts in the two embodiments will be readily perceived by the reader.

A pressure vessel assembly 240 of the third exemplary embodiment of the present invention comprises a hollow, elongated outer casing 42 and at least one fluid-pressure accumulator 26 disposed within the outer casing 42, substantially identical to those according to the first exemplary embodiment of the present invention. In turn, the outer casing 42 includes a hollow, elongated sidewall section 43 having opposite open ends, and opposite first and second closure members 244 and 245, respectively, provided at the opposite ends thereof to define an interior cavity 41 within the outer casing 42. Preferably, the first and second closure members 244 and 245 are substantially identical to second closure member 145 according to the second exemplary embodiment of the present invention illustrated in FIGS. 5-7.

More specifically, each of the first and second closure members 244 and 245 has an annular guide neck 254 extending along the central axis 25 substantially coaxially thereto and defining a central aperture 256 in the respective closure member (244 or 245) receiving the communication port 28a or the gas charging port 28b of the accumulator 26 therethrough. Preferably, the central aperture 256 is substantially coaxial to the central axis 25. Each of the first and second closure members 244 and 245 is further provided with the plurality of stiffening gussets 58 extending between the ventilation holes 49.

According to the third exemplary embodiment of the present invention as illustrated in detail in FIGS. 8 and 9, the hydraulic accumulator 26 is held within the interior cavity 41 of the pressure vessel assembly 240 by the opposite closure members 244 and 245 through first and second isolation devices 250 and 252, respectively. Preferably, the first and second isolation devices 250 and 252 are substantially identical. Further preferably, the first and second isolation devices 250 and 252 are substantially identical to the second isolation device 152 according to the second exemplary embodiment of the present invention illustrated in FIGS. 5-7. More specifically, each of the first and second isolation devices 250 and 252 includes an elastomeric isolator ring (the first and second elastomeric isolator rings 50 and 52, respectively), the guided-sliding isolator ring support member 160, and the isolator ring load spring 166. The isolator ring support member 160 includes an annular support flange 162 and a substantially cylindrical guided neck 164 extending from the support flange 162 and through the guide neck 154 of the first and second closure members 244 and 245 in the direction away from the accumulator 26 and substantially coaxially to the central axis 25. As further shown in FIGS. 8 and 9, a distal end of the guided neck 164 of the isolator ring support member 160 extending through the guide neck 254 of the first and second closure members 244 and 245 is provided with the retaining ring 168.

Each of the isolator rings 50 and 52 is disposed in the groove 163 formed in the support flange 162 of the isolator ring support member 160. The isolator ring load spring 166 is sandwiched between one of the first and second closure members 244 and 245 and the adjacent support flange 162 of the isolator ring support member 160 so as to bias the corresponding elastomeric isolator ring (50 or 52) against the adjacent end (27a or 27b, respectively) of the shell 27 of the hydraulic accumulator 26.

In other words, the closure members 244 and 245 engage the shells 27 of the accumulator 26 through the first and second isolation devices 250 and 252 disposed at the opposite ends 27a and 27b of the shell 27, respectively. More specifically, the first end 27a and the second end 27b of the shell 27 are supported by the isolator ring support members 160 through the first and second elastomeric isolator rings 50 and 52, respectively. A primary advantage of this embodiment is that the accumulator 26 is suspended within the outer casing 42 in vertical applications through the double ring/spring isolation devices 250 and 252.

In use, vibration of the hydraulic accumulator 26 is controlled and suppressed by the first and second elastomeric isolator rings 50 and 52. Furthermore, when the shell 27 of the hydraulic accumulator 26 expands, it displaces the isolator ring support members 160 of the first and second isolation devices 250 and 252 axially outwardly toward the first and second closure members 244 and 245, respectively, against the biasing force of the isolator ring load springs 166. During this displacement, the guided necks 164 of the isolator ring support members 160 of the first and second isolation devices 250 and 252 slide in and is guided by the guide neck 254 of the first and second closure members 244 and 245, respectively, of the pressure vessel assembly 140. When, however, the shell 27 of the hydraulic accumulator 26 contracts, the isolator ring support members 160 of the first and second isolation devices 250 and 252 move axially inwardly away from the first and second closure members 244 and 245 due to the biasing force of the isolator ring load springs 166 guided by the guide necks 254 of the first and second closure members 244 and 245. Such an arrangement of the first and second isolation devices 250 and 252 allows to maintain firm contact between the elastomeric isolator rings 50 and 52 and the accumulator shall 27 while taking up linear expansion or contraction of the accumulator shall 27.

Therefore, according to the third exemplary embodiment of the present invention, the hydro-pneumatic accumulator 26 is supported and protected the accumulator 26 within the outer casing 42 against physical damage so that vibration of the accumulator 26 is controlled through the use of elastomeric isolator rings 50 and 52 of the first and second isolation devices 250 and 252, respectively, while the linear expansion of the elongated outer shell 27 of the hydro-pneumatic accumulator 26 is taken up by the spring loaded and guided isolator ring support members 160 of the first and second isolation devices 250 and 252 at both ends of the accumulator 26. In addition to being able to absorb vibration and shock through the elastomeric isolator rings 50 and 52, the springs 166 of the first and second isolation devices 250 and 252 allow the entire accumulator 26 to move along its long central axis 25. This is especially advantageous when additional tolerance to shock loads along the central axis 25 of the accumulators 26 is desired.

Figure 10:
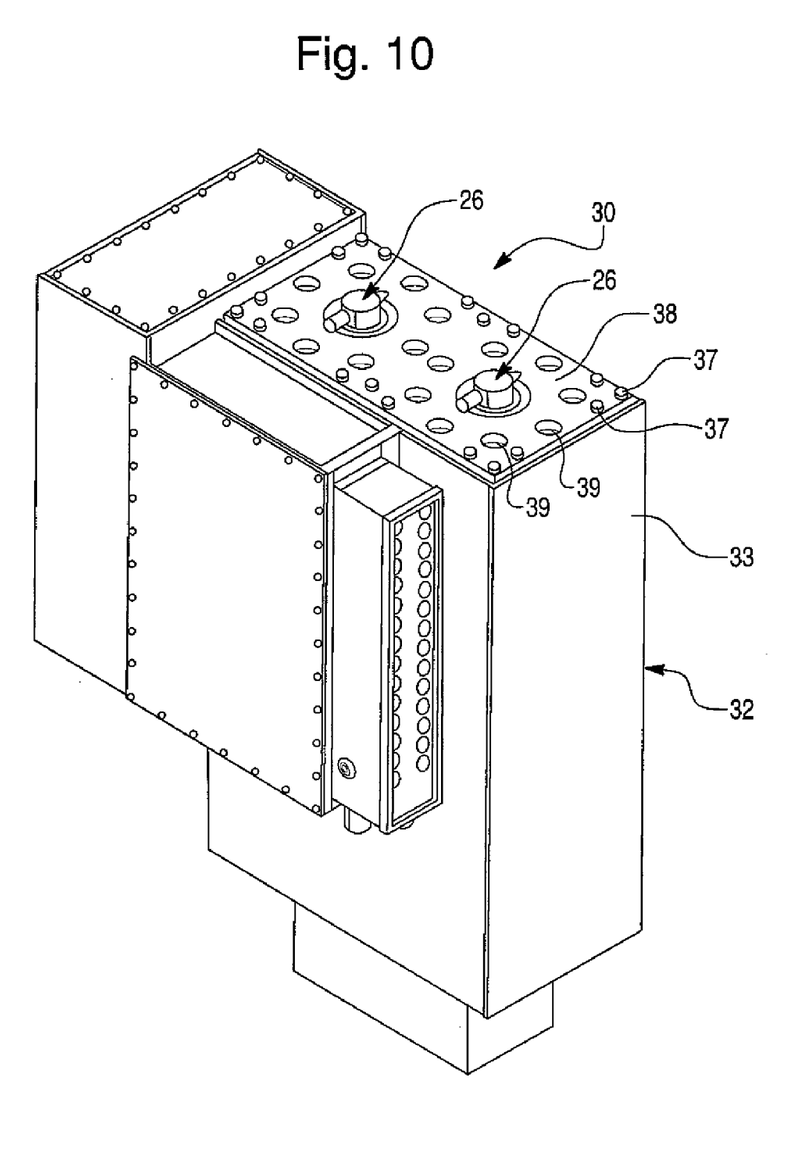
FIG. 10 is a perspective view of a pressure vessel assembly in accordance with a fourth exemplary embodiment of the present invention.
Figure 11:
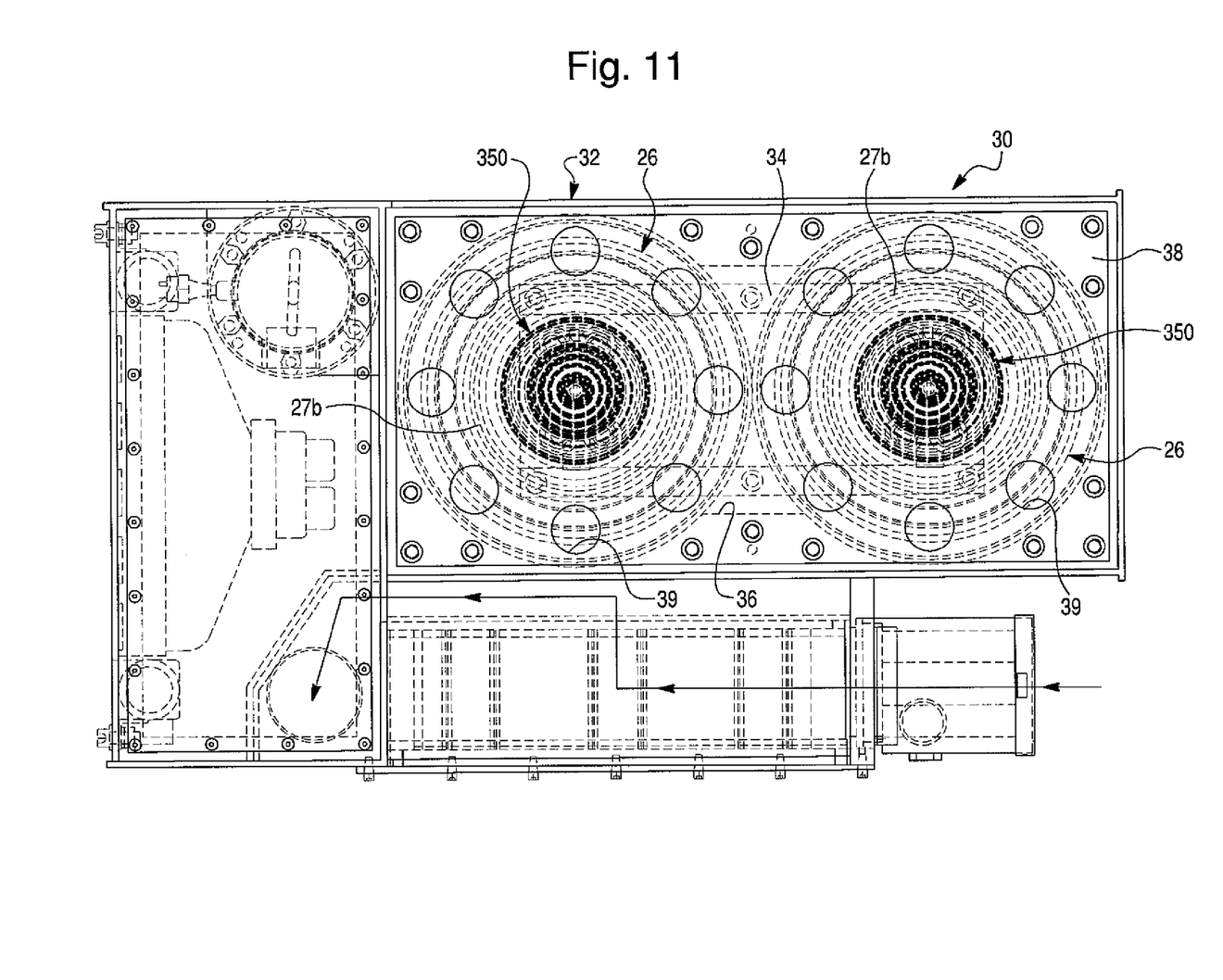
FIG. 11 is a top view of the pressure vessel assembly of FIG. 10.
Figure 12:
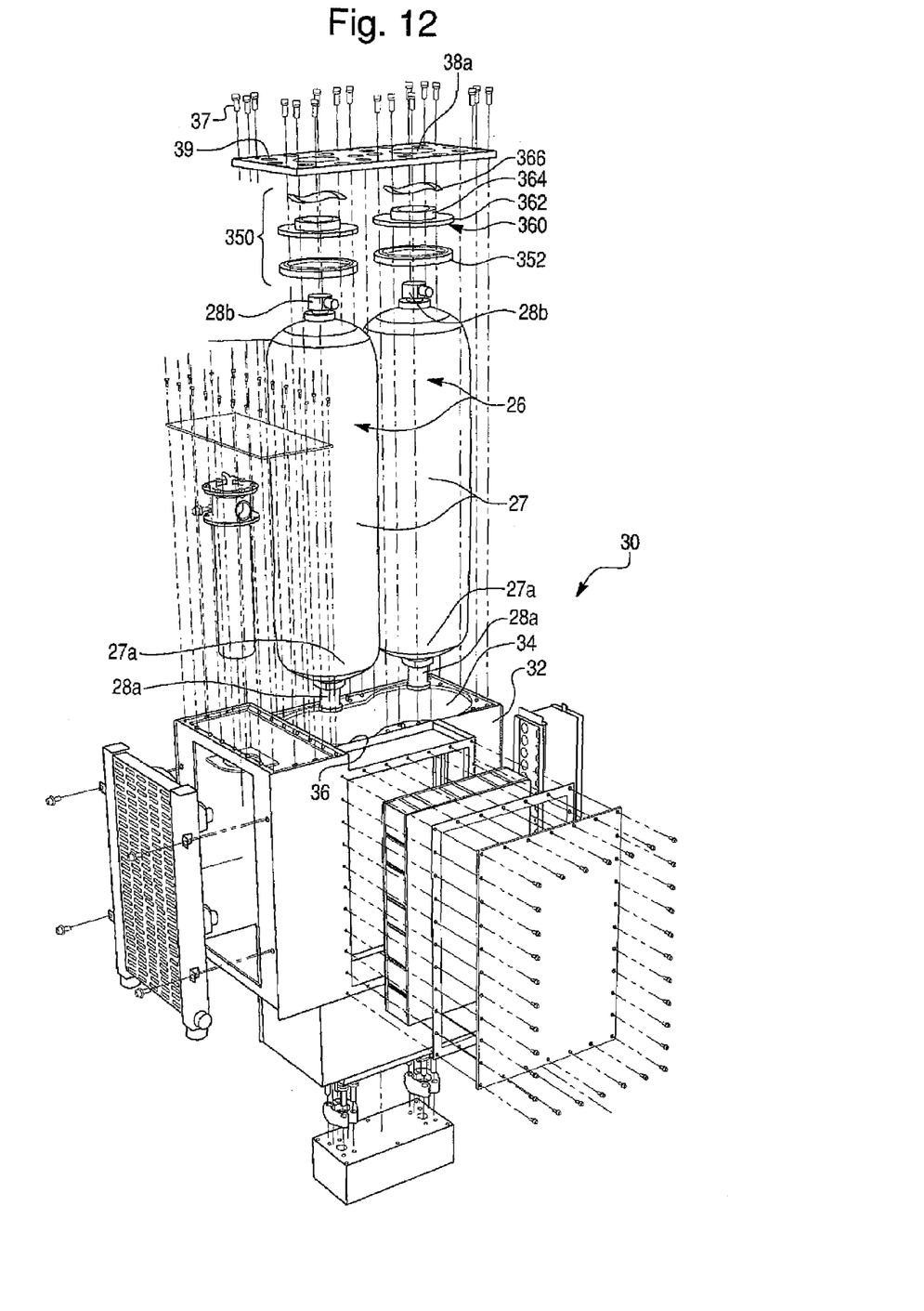
FIG. 12 is an exploded perspective view of the pressure vessel assembly in accordance with the fourth exemplary embodiment of the present invention.

FIGS. 10-12 of the drawings illustrate a fourth exemplary embodiment of a pressure vessel assembly of the pressurized fluid system of the present invention, such as the hydraulic regenerative drive system 20 of the motor vehicle 10. Components, which are unchanged from, or function in the same way as in the first exemplary embodiment depicted in FIGS. 1-9 are labeled with the same reference numerals, sometimes without describing detail since similarities between the corresponding parts in the two embodiments will be readily perceived by the reader.

FIG. 10 depicts a hydraulic component module 30 for the hydraulic fluid system 20.

The hydraulic component module 30 is designed to integrate and modularize the bulk of the essential components of the hydraulic fluid system 20, other than those that convert mechanical energy to and from hydraulic energy and those that are connected to the driveline 18 of the vehicle 10. The hydraulic component module 30 is provided to package as many system components as possible into a single enclosed, modular package.

As illustrated in detail in FIGS. 10-12, the hydraulic component module 30 comprises a housing 32 including a hollow sidewall section 33 forming an interior cavity 34 therewithin. The sidewall section 33 is substantially prismatic in shape and has an open end defining an access opening 36 into the interior cavity 34.

According to the fourth exemplary embodiment of the present invention, the interior cavity 34 of the outer housing 32 of the hydraulic component module 30 defines an enclosed accumulator storage chamber housing one or more hydraulic accumulators 26 directly mounted to the cover member 38 within the interior cavity 34, and does not require the outer casing 42. Preferably, as further illustrated in FIG. 12, the outer housing 32 receives therein two substantially identical hydraulic accumulators 26. The hydraulic accumulators 26 are inserted into the interior cavity 34 through the access opening 36 in the outer housing 32 of the hydraulic component module 30. Also, as shown in FIGS. 10-12, the cover member 38 of the outer housing 32 is provided with one or more ventilation holes 39 therethrough. In the event of an accumulator failure where pressurized gas/liquid is expelled from the outer shell 27 of the hydro-pneumatic accumulator 26 into the interior cavity 34 of the outer casing 32, these ventilation holes 39 will prevent pressure from building up in the outer casing 32. It will be appreciated that the presence and configuration of these ventilation holes 39 may vary from application to application.

Further according to the fourth exemplary embodiment of the present invention, each of the hydraulic accumulators 26 is mounted to the accumulator chamber cover member 38 through substantially identical isolation devices 350. Thus, the hydraulic component module 30 forms a pressure vessel assembly of the forth embodiment of the present invention, and the outer housing 32 of the hydraulic component module 30 defines an outer casing of the pressure vessel assembly of the present invention. Each of the isolation devices 350 includes an elastomeric isolator ring 352, a guided-sliding isolator ring support member 360, and the isolator ring load spring 366. The isolator ring support member 360 includes an annular support flange 362 and a substantially cylindrical guided neck 364 extending from the support flange 362 and through a guide opening 38a in the cover member 38 in the direction away from the accumulator 26 and substantially coaxially to the central axis 25. Alternatively, each of the hydraulic accumulators 26 may by secured within the interior cavity 34 of the hydraulic component module 30 through two isolation devices 350 provided at each end 27a and 27b of the shell 27 of the hydraulic accumulator 26. Further alternatively, the isolation device 350 may be similar to the isolation devices 150 and/or 152 according to the second embodiment of the present invention, or a combination thereof.

In use, vibration of the hydraulic accumulator 26 is controlled and suppressed by the first and second elastomeric isolator ring 352. Furthermore, when the shell 27 of the hydraulic accumulator 26 expands, it displaces the isolator ring support member 360 axially outwardly toward the cover member 38 against the biasing force of the isolator ring load spring 366. During this displacement, the guided neck 364 of the isolator ring support member 360 slides in and is guided by the guide opening 38a of the cover member 38. When, however, the shell 27 of the hydraulic accumulator 26 contracts, the isolator ring support member 360 moves axially inwardly away from the cover member 38 due to the biasing force of the isolator ring load spring 366 guided by the guide opening 38a of the cover member 38. Such an arrangement of the isolation device 350 allows to maintain firm contact between the elastomeric isolator ring 352 and the accumulator shall 27 while taking up linear expansion or contraction of the accumulator shall 27.

Therefore, according to the fourth exemplary embodiment of the present invention, the cover member 38 of the hydraulic component module 30 engages the shell 27 of the accumulator 26 through the elastomeric isolator ring 352 disposed at one of the opposite ends 27b of the shell 27. Such an arrangement supports and protects the accumulator 26 within the outer housing 32 of the hydraulic component module 30 so that vibration of the accumulator 26 is controlled through the use of elastomeric isolator ring 352. The linear expansion of the elongated outer shell 27 of the hydro-pneumatic accumulator 26 is taken up by the spring loaded and guided isolator ring support member 360 of the isolation device 350 at least at one end of the accumulator 26.

Therefore, the pressure vessel assembly in accordance with the present invention provides adequate protection of the fluid-pressure accumulator against physical damage, shock, vibration and linear expansion when used in harsh environments, such as in mobile applications in a regenerative drive system of a motor vehicle, in a compact packaging so as to be capable of being fitted to various types of pressurized fluid systems, including the motor vehicles equipped with the hydraulic regenerative drive system. Also, the pressure vessel assembly of the present invention provides a protective structure for personnel and/or equipment in the vicinity of the accumulators in the event of a failure of the pressure shell.

The foregoing description of the preferred embodiments of the present invention has been presented for the purpose of illustration in accordance with the provisions of the Patent Statutes. It Is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A pressure vessel assembly for a pressurized fluid system, said pressure vessel assembly comprising:
a hollow outer casing defining an interior cavity within said outer casing;
at least one fluid-pressure accumulator disposed within said interior cavity in said outer casing; and
at least one isolation device disposed between said at least one fluid-pressure accumulator and said outer casing, said at least one isolation device includes an isolator ring made of a substantially elastomeric material;
said at least one fluid-pressure accumulator including an outer pressure shell and a separating member movable in said outer pressure shell;
said outer pressure shell defining an enclosed fluid chamber between an inner peripheral surface of said outer pressure shell and said separating member;
said enclosed fluid chamber being provided for containing a working fluid under pressure therein;
said at least one isolation device further including an isolator ring support member supporting said isolator ring and a spring member disposed between said at least one closure member and said isolator ring support member for biasing said isolator ring toward said at least one fluid-pressure accumulator.

2. The pressure vessel assembly as defined in claim 1, wherein said isolator ring is made of a substantially elastomeric material.

3. The pressure vessel assembly as defined in claim 1, wherein said isolator ring support member has an annular support flange receiving said isolator ring and a substantially cylindrical guided neck slidably extending through an opening in said outer casing in the direction away from said at least one fluid-pressure accumulator.

4. The pressure vessel assembly as defined in claim 3, wherein said support flange of said isolator ring support member receives said isolator ring in a groove formed on one side thereof facing said at least one fluid-pressure accumulator, and wherein said spring member engages the other side of said support flange facing said outer casing.

5. A pressure vessel assembly for a pressurized fluid system, said pressure vessel assembly comprising:
   a hollow outer casing defining an interior cavity within said outer casing;
   at least one fluid-pressure accumulator disposed within said interior cavity in said outer casing; and
   at least one isolation device disposed between said at least one fluid-pressure accumulator and said outer casing;
   said at least one fluid-pressure accumulator including an outer pressure shell and a separating member movable in said outer pressure shell;
   said outer pressure shell defining an enclosed fluid chamber between an inner peripheral surface of said outer pressure shell and said separating member;
   said enclosed fluid chamber being provided for containing a working fluid under pressure therein;
   said outer casing including a hollow sidewall section and two closure members provided at opposite ends of said sidewall section of said outer casing; and
   said at least one isolation device including two isolation devices each disposed at one of opposite ends of said at least one fluid-pressure accumulator between said at least one fluid-pressure accumulator and one of said closure members of said outer casing.

6. The pressure vessel assembly as defined in claim 5, wherein one of said isolation devices includes an isolator ring.

7. The pressure vessel assembly as defined in claim 6, wherein said isolator ring is made of a substantially elastomeric material.

8. The pressure vessel assembly as defined in claim 7, wherein the other one of said isolation devices includes an isolator ring, an isolator ring support member supporting said isolator ring and a spring member disposed between said adjacent one of said endplate members and said isolator ring support member for biasing said isolator ring toward said at least one fluid-pressure accumulator.

9. The pressure vessel assembly as defined in claim 5, wherein each of said isolation devices includes an isolator ring.

10. The pressure vessel assembly as defined in claim 5, wherein each of said isolation devices includes an isolator ring, an isolator ring support member supporting said isolator ring and a spring member disposed between said adjacent one of said endplate members and said isolator ring support member for biasing said isolator ring toward said at least one fluid-pressure accumulator.

* * * * *